United States Patent
Smith et al.

(10) Patent No.: US 10,116,986 B2
(45) Date of Patent: Oct. 30, 2018

(54) DIGITAL VIDEO RECORDER STATE CACHE

(71) Applicant: Time Warner Cable Enterprises LLC, New York, NY (US)

(72) Inventors: Robert Todd Smith, Boulder, CO (US); Douglas Frusciano, Lafayette, CO (US); Carissa Mahonchak, Broomfield, CO (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 0 days.

(21) Appl. No.: 15/632,308

(22) Filed: Jun. 24, 2017

(65) Prior Publication Data
US 2017/0295395 A1 Oct. 12, 2017

Related U.S. Application Data

(62) Division of application No. 14/261,155, filed on Apr. 24, 2014, now Pat. No. 9,693,105.

(51) Int. Cl.
| | |
|---|---|
| *H04N 7/173* | (2011.01) |
| *H04N 21/433* | (2011.01) |
| *H04N 21/231* | (2011.01) |
| *H04N 21/4147* | (2011.01) |
| *H04N 21/472* | (2011.01) |
| *H04N 21/2747* | (2011.01) |
| *H04N 21/643* | (2011.01) |
| *H04N 21/436* | (2011.01) |

(52) U.S. Cl.
CPC ... *H04N 21/4331* (2013.01); *H04N 21/23106* (2013.01); *H04N 21/2747* (2013.01); *H04N 21/4147* (2013.01); *H04N 21/436* (2013.01); *H04N 21/4334* (2013.01); *H04N 21/47202* (2013.01); *H04N 21/47217* (2013.01); *H04N 21/64322* (2013.01); *H05K 999/99* (2013.01)

(58) Field of Classification Search
CPC combination set(s) only.
See application file for complete search history.

(56) References Cited

U.S. PATENT DOCUMENTS

| | | |
|---|---|---|
| 7,073,189 B2 | 7/2006 | McElhatten et al. |
| 7,792,963 B2 | 9/2010 | Gould et al. |
| | (Continued) | |

OTHER PUBLICATIONS

"Dish Network Hopper", downloaded from http://www.pcmag.com/article2/0,2817,2403072,00.asp on Jan. 15, 2014, pp. 1-6.
(Continued)

*Primary Examiner* — Mulugeta Mengesha
(74) *Attorney, Agent, or Firm* — Otterstedt, Ellenbogen & Kammer, LLP

(57) ABSTRACT

A digital video recorder control database is maintained for a digital video recorder in communication with a plurality of set-top boxes. The database includes program content, associated programming metadata, and a recording schedule. A subset of the digital video recorder control database is pushed from the digital video recorder control database to the plurality of set-top boxes for local caching on the plurality of set-top boxes. The subset includes at least a portion of the recording schedule.

6 Claims, 15 Drawing Sheets

(56) References Cited

U.S. PATENT DOCUMENTS

| | | | |
|---|---|---|---|
| 8,180,200 B2 | 5/2012 | Hasek | |
| 8,750,687 B2 | 6/2014 | Hubner et al. | |
| 9,014,540 B1 | 4/2015 | Cholas | |
| 2003/0056217 A1 | 3/2003 | Brooks | |
| 2005/0034171 A1 | 2/2005 | Benya | |
| 2005/0097623 A1* | 5/2005 | Tecot | G11B 27/10 725/136 |
| 2005/0251835 A1* | 11/2005 | Scott, III | H04N 7/17318 725/88 |
| 2006/0130107 A1 | 6/2006 | Gonder et al. | |
| 2007/0217436 A1 | 9/2007 | Markley et al. | |
| 2008/0310825 A1 | 1/2008 | Fang | |
| 2009/0052863 A1 | 2/2009 | Parmar et al. | |
| 2009/0052870 A1 | 2/2009 | Marsh et al. | |
| 2009/0220216 A1 | 9/2009 | Marsh et al. | |
| 2009/0228569 A1* | 9/2009 | Kalmanje | H04N 7/17309 709/217 |
| 2009/0248794 A1 | 10/2009 | Helms | |
| 2010/0027966 A1* | 2/2010 | Harrang | H04N 5/775 386/241 |
| 2010/0154012 A1* | 6/2010 | Clavenna | H04N 7/17318 725/109 |
| 2010/0313236 A1 | 12/2010 | Straub | |
| 2012/0054808 A1* | 3/2012 | Nijim | H04N 21/47202 725/88 |
| 2014/0025769 A1 | 1/2014 | Shrum, Jr. et al. | |
| 2014/0068688 A1 | 3/2014 | Sarosi et al. | |
| 2015/0312616 A1 | 10/2015 | Smith | |

OTHER PUBLICATIONS

"Cache (computing)", downloaded from http://en.wikipedia.org/wiki/Cache_(computing) on Jan. 15, 2014 pp. 1-7.

"Comet (programming)", downloaded from Comet (programming)—Wikipedia, the free encyclopedia on Jan. 15, 2014 pp. 1-6.

"Database caching", downloaded from http://en.wikipedia.org/wiki/Database_caching on Jan. 15, 2014 pp. 1-3.

"Server-sent events", downloaded from http://en.wikipedia.org/wiki/Server-sent_events on Jan. 15, 2014 pp. 1-3.

"Web cache", downloaded from http://en.wikipedia.org/wiki/Web_cache on Jan. 15, 2014 pp. 1-2.

"WebSocket", downloaded from http://en.wikipedia.org/wiki/WebSocket on Jan. 15, 2014 pp. 1-6.

"Consumer Home", downloaded from http://www.dlna.org/ on Feb. 11, 2014 pp. 1-2.

"Digital video recorder", downloaded from http://en.wikipedia.org/wiki/Digital_video_recorder on Feb. 18, 2014 pp. 1-9.

"DLNASourceURI Attribute", downloaded from http://msdn.microsoft.com/en-us/library/windows/desktop/dd562747 on Feb. 11, 2014 p. 1.

"Hopper with Sling Review", downloaded from http://www.laptopmag.com/review/wi-fi/hopper-with-sling.aspx on Feb. 18, 2014 p. 1.

\* cited by examiner

DIGITAL VIDEO RECORDER STATE CACHE

CROSS-REFERENCE TO RELATED APPLICATION(S)

This application is a divisional of U.S. application Ser. No. 14/261,155 filed Apr. 24, 2014. The complete disclosure of U.S. application Ser. No. 14/261,155 is expressly incorporated herein by reference in its entirety for all purposes.

FIELD OF THE INVENTION

The present invention relates generally to recording and playback of video content, and, more particularly, to digital video recorders and the like.

BACKGROUND OF THE INVENTION

A digital video recorder (DVR) records video in a digital format to a local and/or networked mass storage device. Some DVRs include multiple tuners to permit, for example, recording one or more live programs while watching another live program simultaneously or to record two or more programs at the same time, possibly while watching a previously recorded one.

SUMMARY OF THE INVENTION

Principles of the present invention provide a system, method, and computer program product for digital video recorder state caching. In one aspect, an exemplary method includes the steps of maintaining, for a digital video recorder in communication with a plurality of set-top boxes, a digital video recorder control database including program content, associated programming metadata, and a recording schedule; and pushing, from the digital video recorder control database to the plurality of set-top boxes, a subset of the digital video recorder control database for local caching on the plurality of set-top boxes, the subset including at least a portion of the recording schedule.

In another aspect, another exemplary method includes the step of maintaining, on a first set-top box in communication with a digital video recorder control database which in turn is in communication with a plurality of set-top boxes including the first set-top box, a cache including a subset of the digital video recorder control database. The digital video recorder control database includes program content, associated programming metadata, and a recording schedule. The cache includes at least a portion of the recording schedule. Further steps include updating the cache on the first set-top box to reflect an action; sending, from the first set-top box to the digital video recorder control database, an indication of the action; and obtaining, at a second set-top box, a message pushed from the digital video recorder control database at least to all of the plurality of set-top boxes other than the first set-top box. The message indicates that the digital video recorder control database has been updated to reflect the action and that caches of at least the plurality of set-top boxes other than the first set-top box should accordingly be updated. The second set-top box is one of the plurality of set-top boxes.

In yet another aspect, yet another exemplary method includes the step of maintaining a bookmark service database in communication with a plurality of set-top boxes. The bookmark service database includes a plurality of bookmarks for a plurality of programs. Each of the bookmarks in turn includes a program identifier and a play position. A further step includes pushing, from the bookmark service database to the plurality of set-top boxes, at least a portion of the bookmark service database for local caching on the plurality of set-top boxes.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:
  faster response times;
  reduced network bandwidth requirements as required items are accessed from the cache rather than over the network.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
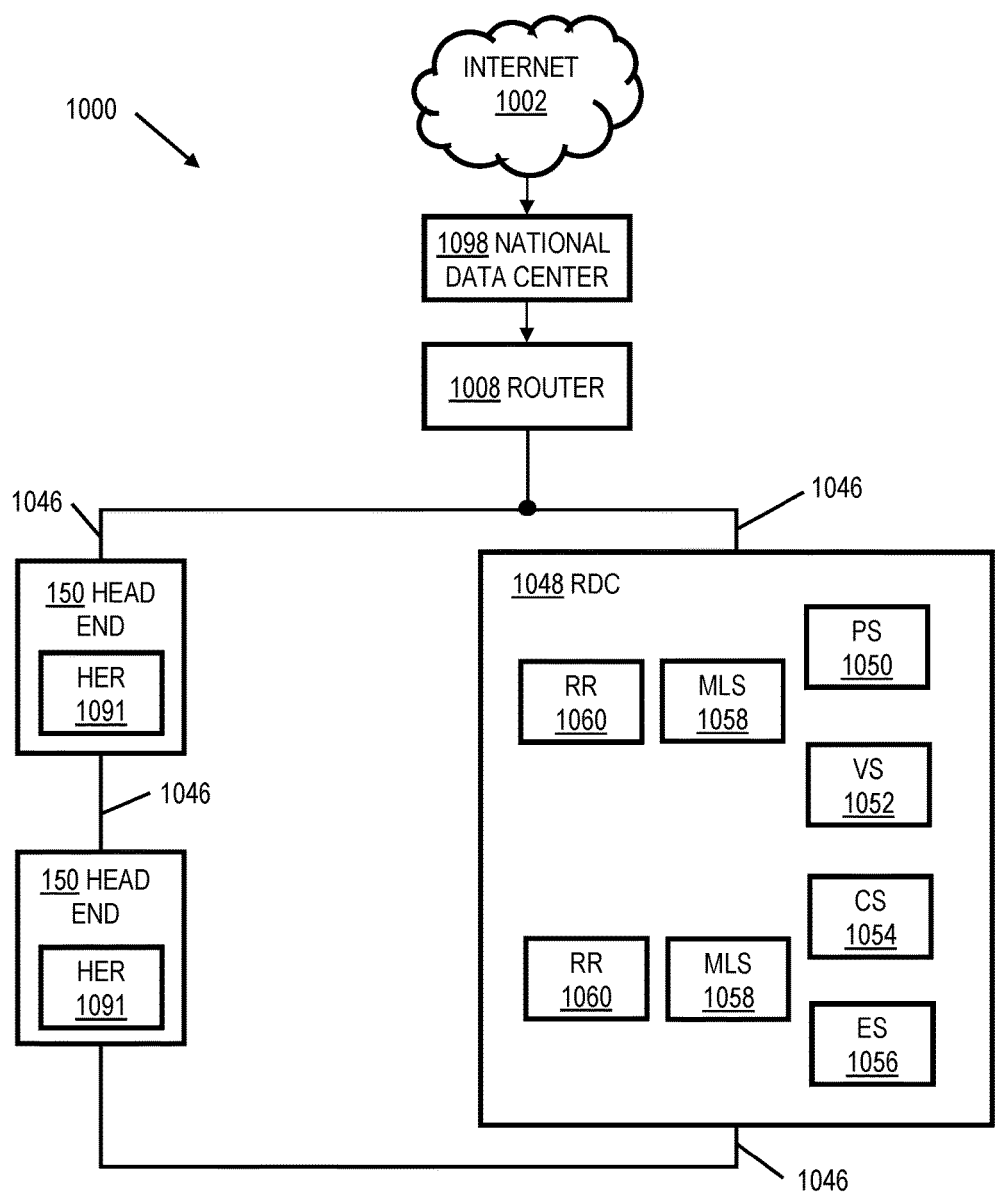
FIG. 1 is a block diagram of an exemplary embodiment of a system, within which one or more aspects of the invention can be implemented.

Purely by way of example and not limitation, some embodiments will be shown in the context of a cable multi-service operator (MSO) providing entertainment services and optionally data services as well. FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from figures below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002.

Figure 2:
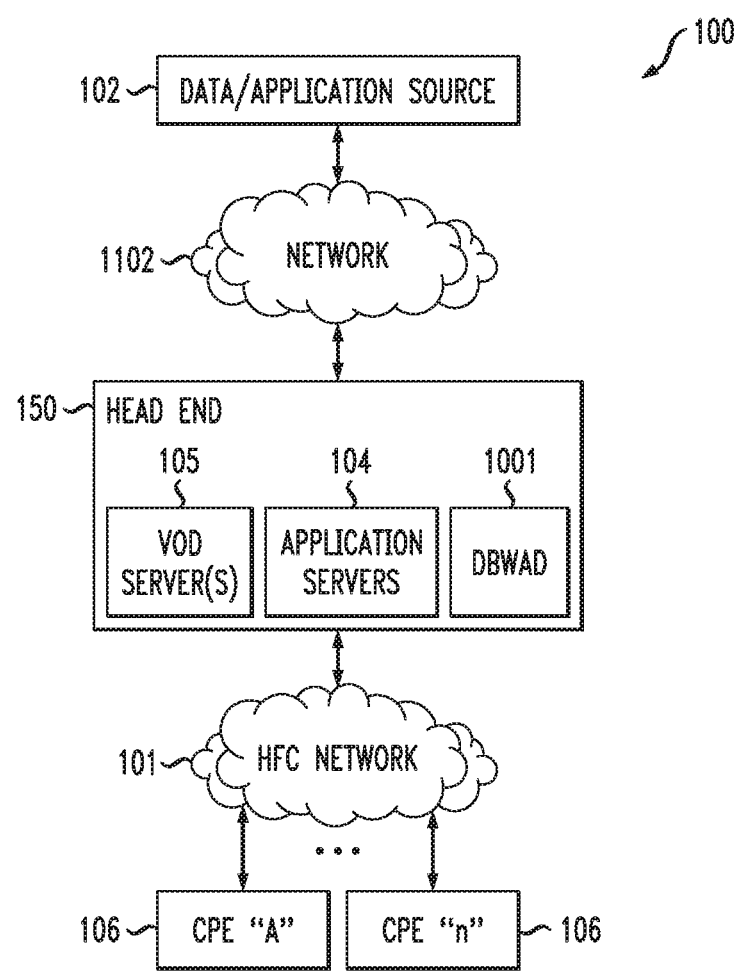
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
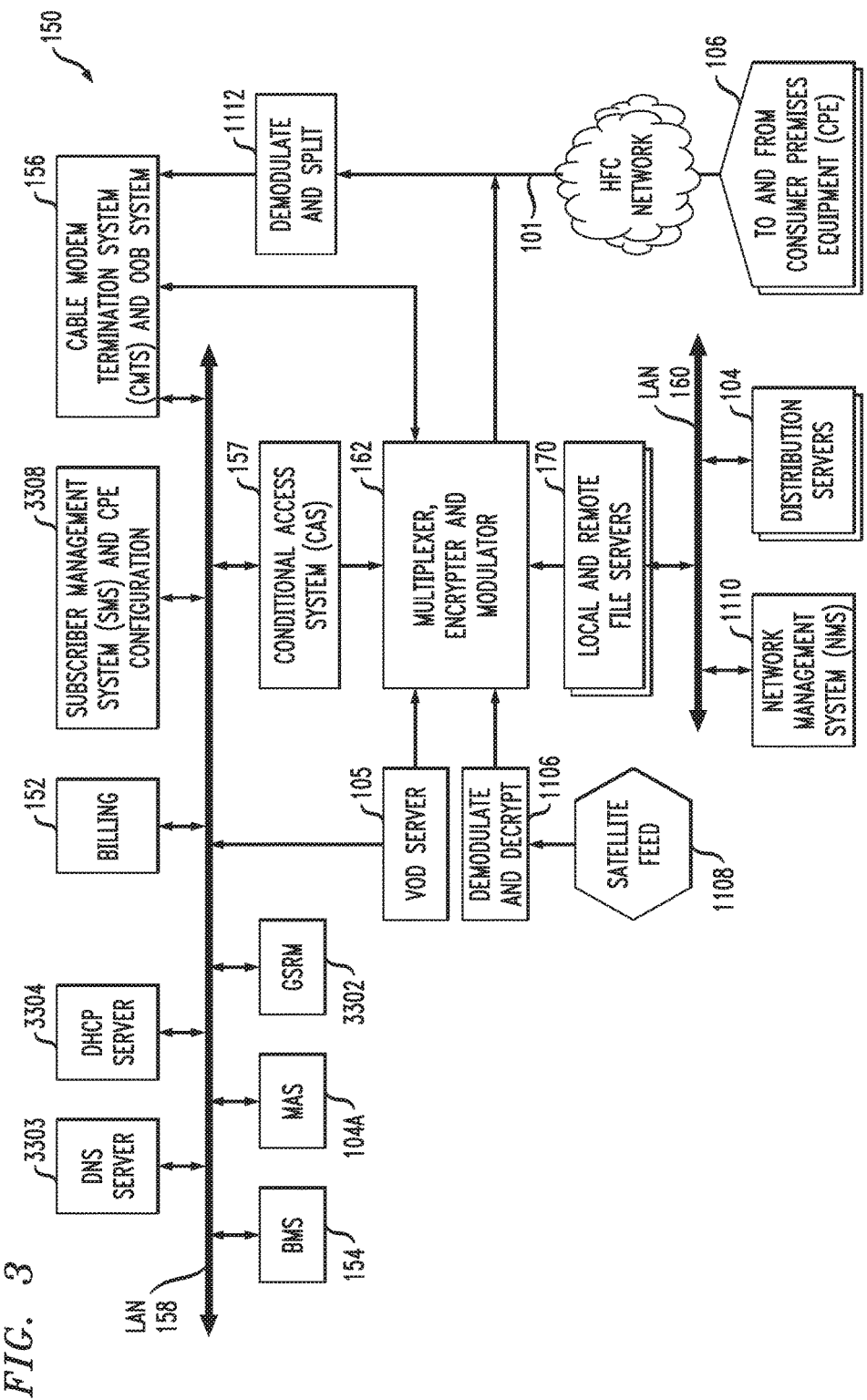
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable' Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
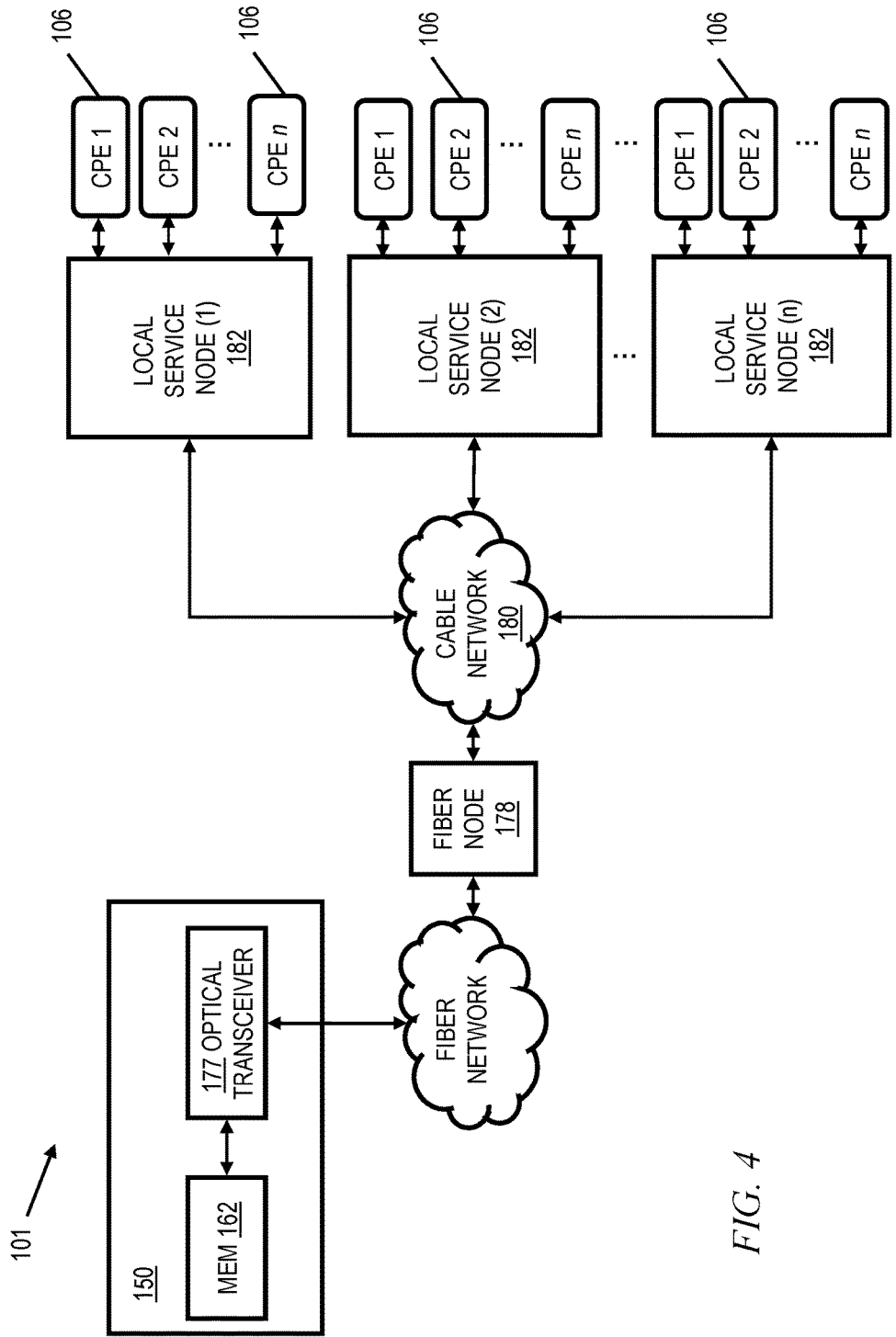
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

Certain additional aspects of video or other content delivery will now be discussed. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes. It is worth noting that in some instances, embodiments of the invention can be used in connection with networks including a converged premises gateway device such as disclosed in US Patent Publication 2009-0248794 and/or US Patent Publication 2007-0217436; however, one or more embodiments are generally applicable to a multi-tuner DVR and do not necessarily require all the specific capabilities shown in US Patent Publication 2009-0248794 and/or US Patent Publication 2007-0217436.

Many types of CPE can be employed in one or more embodiments; for example, a cable modem, DSL modem, and the like.

Figure 5:
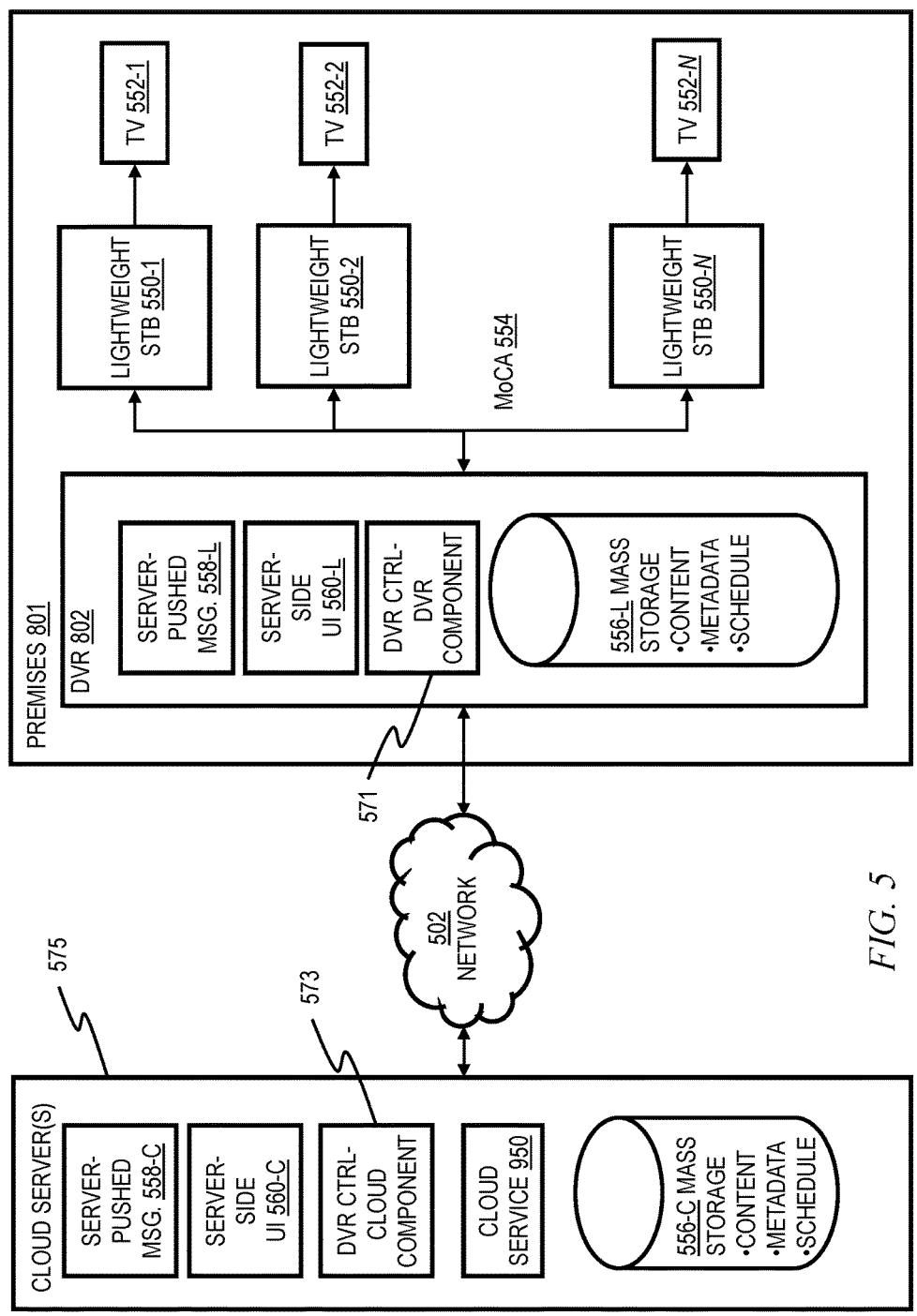
FIG. 5 is a functional block diagram of a premises network, including a DVR and a plurality of lightweight set-top boxes, in accordance with an aspect of the invention.
Figure 6:
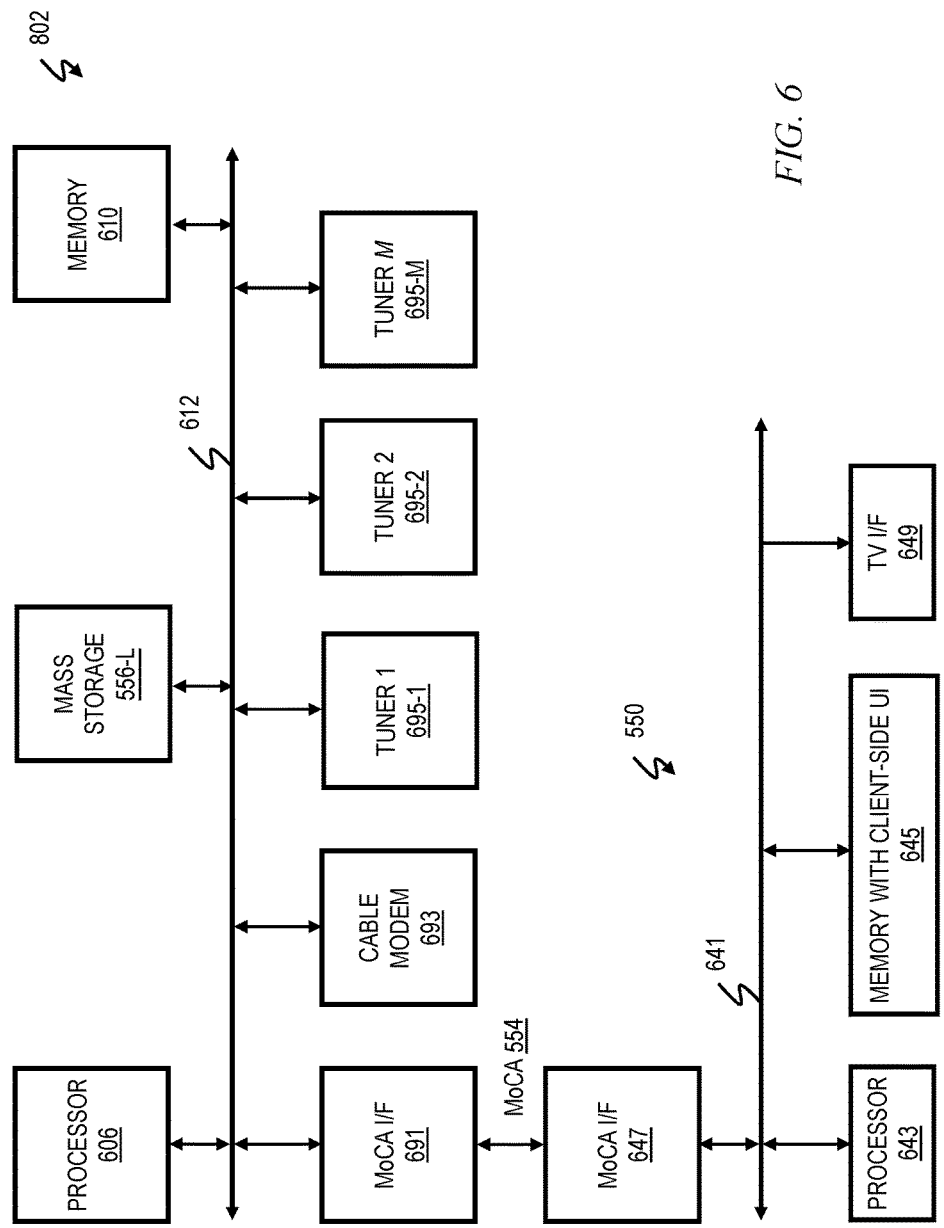
FIG. 6 is a functional block diagram of an exemplary DVR interconnected with an exemplary lightweight set-top box, in accordance with an aspect of the invention.

In addition to "broadcast" content (e.g., video programming), the systems of FIGS. 1-6 (FIGS. 5 and 6 are discussed below) optionally also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Referring now to FIGS. 5 and 6, a digital video recorder (DVR), such as DVR 802, records video in a digital format to a local and/or networked mass storage device, such as local mass storage 556-L or cloud-based mass storage 556-C. Some DVRs include multiple tuners 695-1, 695-2, . . . , 695-M to permit, for example, recording one or more live programs while watching another live program simultaneously or to record two or more programs at the same time, possibly while watching a previously recorded one. In one or more embodiments, a multi-tuner DVR 802 with a large storage capacity effectively acts as a server within the premises 801, sending video signals out to multiple "thin" clients in the premises (e.g., lightweight set-top boxes 550-1, 550-2, . . . , 550-N with limited storage capability, generally referred to as reference character 550). The lightweight set-top boxes 550 each have a corresponding interconnected television (TV) 552-1, 552-2, 552-N, generally referred to as reference character 552.

Please note that the value of "n" in FIG. 2 may differ from the value of "n" in FIG. 4, and both are generally different than the value of "N" in FIG. 5.

The full database of DVR recording data stored in mass storage 556-L or 556-C can be tens of megabytes or more. A web application (e.g., client-side user interface (UI) residing in memory 645 of the set-top box 550) running on a set top box 550 connected to the DVR server 802 requires information about the recorded and scheduled programs but has limited memory capacity to replicate this large database. The data may change due to DVR server scheduling, actions from another set top box 550, or local actions. To work within the memory constraints of the "thin" client while having instant access to required data, the web application replicates a subset of the DVR data, referred to as the DVR cache. The DVR cache is updated locally on the given STB 550 to immediately reflect user actions, and the DVR cache is also synchronized with the DVR server 802 via DVR server-pushed messages (using W3C long polls, web sockets, server sent events, or the like) representing individual records or global changes. The client-side UI in memory 645 interacts with the server-side UI component 560-L (in in-premises DVR 802) or at 560-C (on cloud server 575). The server-pushed messaging component is shown at 558-L (on in-premises DVR 802) and at 558-C (on cloud server 575).

Some embodiments are also applicable to cloud-based rather than premises-based DVRs, and/or to hybrid arrangements with some or all of scheduling and/or other control(s) in the cloud but with the physical DVR in the premises. FIG. 5 shows a hybrid control approach wherein the physical DVR 802 is in the premises, a portion of the control functionality (DVR Controller-DVR Component 571) is located on the DVR 802, and a portion of the control functionality (DVR Controller-Cloud Component 573) is located in the cloud (on one or more cloud servers 575 (e.g., in head end 150)). For example, some embodiments can be used in cases where a DVR is controlled from remote devices such as a smart phone, personal computer (PC), or the like. Cloud service 950 on cloud server 575 could provide information about a series that is to have some or all episodes recorded with DVR 802 and/or could provide services to schedule recordings or otherwise control DVR 801. A cloud-based DVR, also known as a network personal video recorder (NPVR) or network digital video recorder (NDVR) could be located in the cloud, e.g., in head end 150. Refer to the material incorporated by reference below. The cloud service 950 interacts with the DVR 802 and/or STBs 550 over a suitable network 502, such as a TCP/IP network. One non-limiting specific example of a network includes the HFC network 101 discussed above. The following US patents and patent applications are expressly incorporated herein by reference in their entireties for all purposes:

US 2009-0052863 A1, Vaibhav Parmar et al., APPARATUS AND METHOD FOR REMOTE WIRELESS CONTROL OF DIGITAL VIDEO RECORDERS AND THE LIKE US 2009-0052870 A1, Christopher Marsh et al., APPARATUS AND METHOD FOR REMOTE CONTROL OF DIGITAL VIDEO RECORDERS AND THE LIKE US 2009-0220216 A1, Christopher Marsh et al., APPARATUS AND METHOD FOR CONFLICT RESOLUTION IN REMOTE CONTROL OF DIGITAL VIDEO RECORDERS AND THE LIKE US 2005-0034171 A1, Robert Benya, TECHNIQUE FOR DELIVERING PROGRAMMING CONTENT BASED ON A MODIFIED NETWORK PERSONAL VIDEO RECORDER SERVICE U.S. Pat. No. 7,073,189, David McElhatten et al., PROGRAM GUIDE AND RESERVATION SYSTEM FOR NETWORK BASED DIGITAL INFORMATION AND ENTERTAINMENT STORAGE AND DELIVERY SYSTEM U.S. Pat. No. 8,180,200 of Charles Hasek, PREVENTION OF TRICK MODES DURING DIGITAL VIDEO RECORDER (DVR) AND NETWORK DIGITAL VIDEO RECORDER (NDVR) CONTENT Unpublished U.S. patent application Ser. No. 13/551,422, Chris Cholas et al., TECHNIQUES FOR PROVISIONING LOCAL MEDIA PLAYERS WITH CONTENT, filed Jul. 17, 2012

Figure 12:
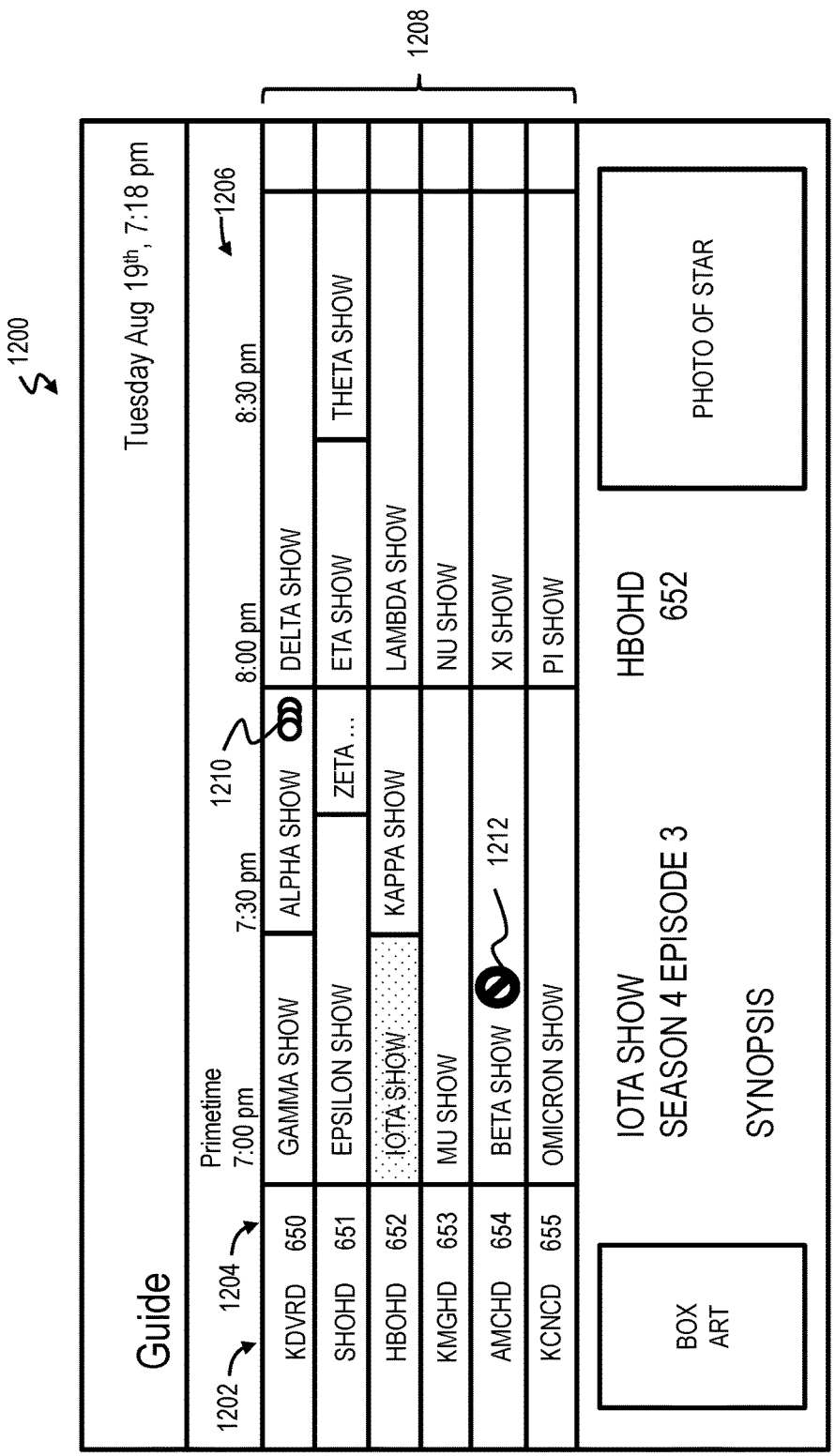
FIG. 12 shows an exemplary guide screen with recording status indicators that may be locally cached, in accordance with an aspect of the invention.

US 2014-0068688 A1, George Sarosi et al., APPARATUS AND METHODS FOR CONTROLLING DIGITAL VIDEO RECORDERS Thus, in one or more embodiments, "thin" clients on low-capability set-top boxes 550 are linked to the high-capacity in-premises DVR 802. The full database is on the high-capacity in-premises DVR 802; however, the user interface (UI) on the low-capability set-top boxes (in memory 645 thereof) needs to quickly display recording status. For example, if there is a change of channels on a particular STB 550, the user should see a channel banner come up on the screen of the corresponding television (TV) with a description of the show playing on the new channel. This banner should also have a recording indication on it, if appropriate. Similarly, if the user of a particular STB 550 brings up on the screen of the corresponding TV a grid guide with cells, it is desirable that each cell includes a visual indication of whether recordings are scheduled. Refer to FIG. 12 which shows an exemplary guide screen 1200. For each of a plurality of different channels, the channel name abbreviation and channel number are displayed in columns 1202, 1204. Timeslot is displayed at 1206. The different programs available at each time on each channel are displayed at 1208. Here, the "ALPHA SHOW" includes a recording status indicator 1210 showing that it is scheduled to record as part of a series recording, while the "BETA SHOW" includes a recording status indicator 1212 showing that it cannot record due to a conflict. It is undesirable to add additional delay when displaying items such as recording status indicators 1210, 1212 to users on the low-capability set-top boxes 550, as would be encountered if the information had to always be obtained from the premises-based DVR 802 or a cloud-based DVR. In one or more embodiments, required data is cached locally on the low-capability set-top boxes 550 to avoid the need to access the high-capacity in-premises DVR 802 or a cloud-based DVR.

In FIG. 12, box art (not separately numbered) for the currently highlighted show (here, the "IOTA SHOW") can be displayed next to a synopsis of the current episode (here, season 4, episode 3), the channel (here, HBOHD 652) and a picture of the star.

Thus, by way of review and provision of additional detail, one or more embodiments include an in-premises DVR 802 which can store a large amount of audiovisual content in mass storage 556-L (e.g., a high-capacity hard drive). This content can be obtained, for example, from head end 150, national or regional data centers 1098, 1048, directly from a satellite dish, or in any other suitable fashion. Multiple lightweight STBs 550 are attached to different TVs 552 in the house or other premises 801. Any suitable network connection can be used between the DVR 802 and STBs 550. In the non-limiting example of FIGS. 5 and 6, multimedia over coax alliance (MoCA) interconnectivity 554 is employed.

Mass storage 556-L includes stored content to be viewed later, a recording schedule (what to record, when to record it, and on what tuner 695 to record it), and full metadata for every show scheduled for recordation—such metadata typically includes the description, actors, advisory ratings, and the like. Part or all of the schedule can be stored in the cloud at 556-C in alternative embodiments.

The database comprising the recordings and metadata is very large. Because DVR box 802 has a hard drive or other mass storage 556-L, it can store this large amount of data. "Thin" STBs 550 typically do not have hard drives and have a limited amount of memory 645. One or more embodiments cache certain needed fields only on the lightweight boxes 550. In some embodiments, the system is, in essence, like a VM (virtual machine) on the "thin" STB—web browser. Furthermore in this regard, a virtual machine is involved here in the sense that the web application runs in a JavaScript (more accurately an ECMA Script) virtual machine. This is a standard way web browsers work; that is, they run a JavaScript virtual machine for each page. Note that one or more embodiments are generally applicable to any application running on the STB whether it is a web application, native, or some other language and/or VM. It is worth noting that in addition to the DVR cache, other applications on the thin STBs 550 need to use memory 645 as well.

In one or more embodiments, a web application runs on the "thin" STBs (e.g., client-side UI in memory 645) and the same web application (e.g., server-side UI 560-L) also runs on the DVR 802 or in the cloud (as seen at 560-C). In one or more embodiments, the STBs 550 are Internet-Protocol (IP) STBs. A service 558-L also runs on the DVR 802 to push out the data that needs to be locally cached on the thin STBs 550. Exemplary services include W3C long polls, web sockets, or server-sent events.

It is worth noting as an aside that in addition to cases where the IP STBs are connected to a DVR in the home network, at least some embodiments are also useful where the IP STBs, instead of being connected to a DVR in the home network, receive DVR content from the cloud.

Server-pushed messaging module 558-L or 558-C can push a variety of data down to the thin IP STBs 550. Non-limiting examples include:

depending on video streaming mechanism, uri (uniform resource identifier);

recording information such as actual start time, scheduled start time, run time (length of asset), recorded duration, a unique database key for the particular recording on the DVR 802, recording status (e.g., scheduled to record, conflict, series recording or individual episode), partial recording progress; and/or additional fields in the metadata allowing the STB 550 to go out to the cloud to obtain additional metadata from the cloud that is not on the DVR 802.

Some embodiments utilize the DLNA open source protocol for streaming media files within a home network; i.e., for streaming assets between the DVR 802 and the thin STBs 550. However, this is a non-limiting example, and one or more embodiments are independent of the streaming protocol.

It will be appreciated that one or more embodiments keep a DVR cache in the memory 645 of thin STBs 550. The DVR cache is synchronized with the DVR 802 (more specifically, with the DVR controller realized as component 571 and/or component 573); however, cache synchronization may not occur instantaneously. Suppose a user is using one of the thin STBs 550 to view a programming "grid" guide on the corresponding TV 552, and the user decides to schedule a recording. See the discussion of FIG. 9 below. It may take a few seconds to send a request from the box 550 to the DVR 802 to cause the recording to be scheduled and for an update notification to be sent. Accordingly, one or more embodiments update the cache locally on the client (STB 550) that made the request; thus, information that the recording has been scheduled is reflected immediately in the local UI on the particular box 550. In one or more embodiments, the updated information is not reflected to the other STBs 550 until changed on the DVR 802.

Figure 15:
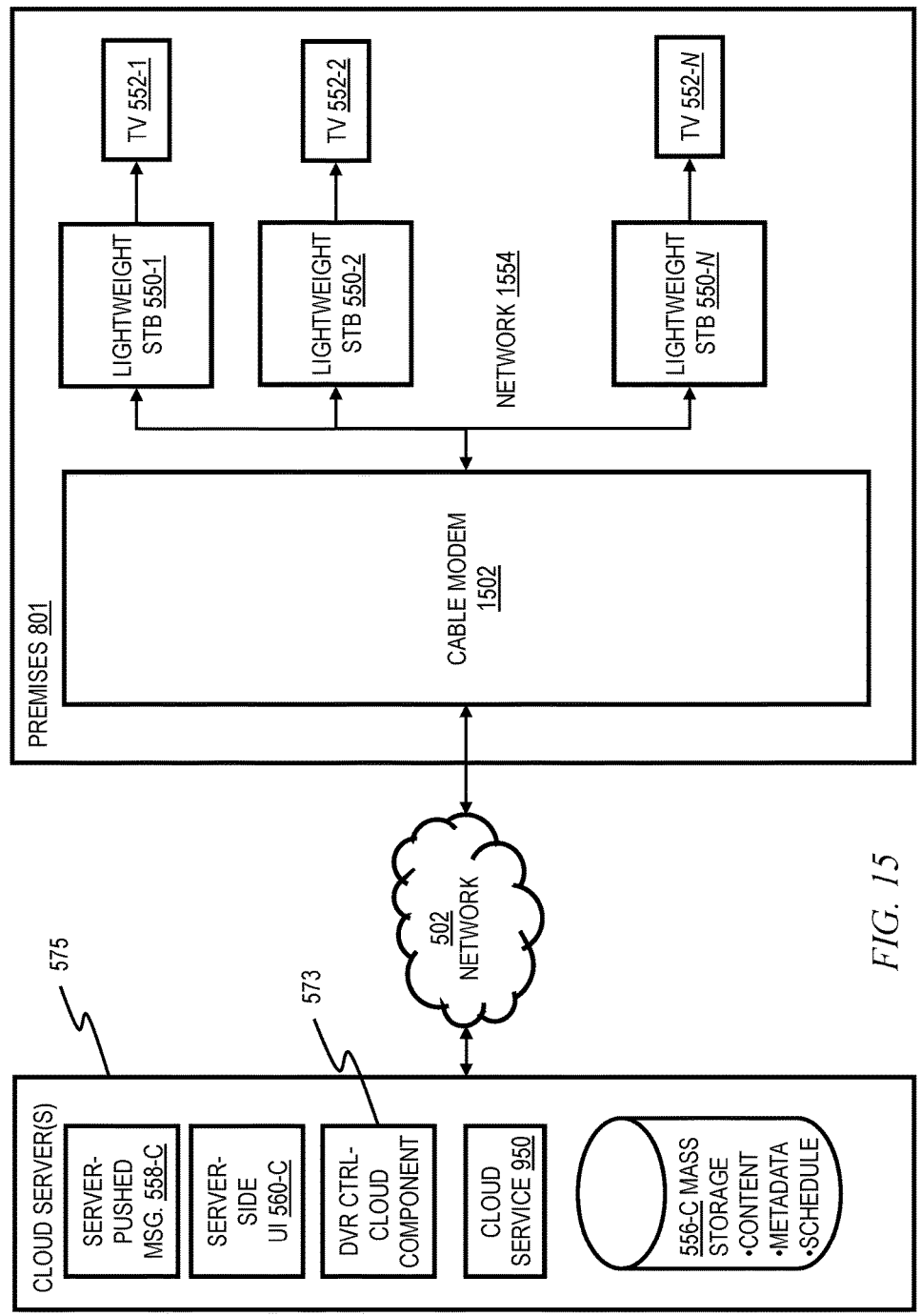
FIG. 15 is a functional block diagram similar to FIG. 5 but with DVR functionality solely in the cloud and a simple cable modem in the premises, in accordance with an aspect of the invention.

One or more embodiments are also useful to contact various cloud services 950 as part of the UI. Refer to the discussion of FIG. 11 below. For example, some embodiments display a product details page for any show that a user might see in the grid guide. The services used to return relevant information about that show should know the recording status of the show, i.e., whether it is scheduled for recording or already recorded. In one or more embodiments, locally cached information in memory 645 is sent out with such requests to the cloud, so that it is not necessary to obtain a response from DVR 802, which would slow down the request. In this regard, it should be noted that IP STBs 550 can typically access the Internet directly through a cable modem in the premises 801. This cable modem can be a separate unit or can be incorporated into the DVR 802 as shown at 693, for example. In some instances where the cable modem is incorporated in the DVR, the cable modem can be a dedicated cable modem in the DVR, separate from the cable modem that the customer uses for his or her Internet service. Of course, when using one or more embodiments with a cloud-based DVR, the cable modem in the premises would be separate from the DVR in the cloud. Such a case is shown in FIG. 15, wherein elements similar to those in FIG. 5 have received the same reference character. Instead of the DVR 802, lightweight STBs 550-1 through 550-N have network access via a suitable network connection 1554 to a cable modem 1502. DVR functionality in this example resides in cloud server 575. Note that FIG. 5 shows a MoCA network 554 but any suitable network can be used; e.g., wireless, Ethernet, or other wired network. Furthermore, a wireless, Ethernet, or other wired network could be used for network 1554 in FIG. 15; in some instances, a MoCA network could even be used in the example of FIG. 15.

Figure 13:
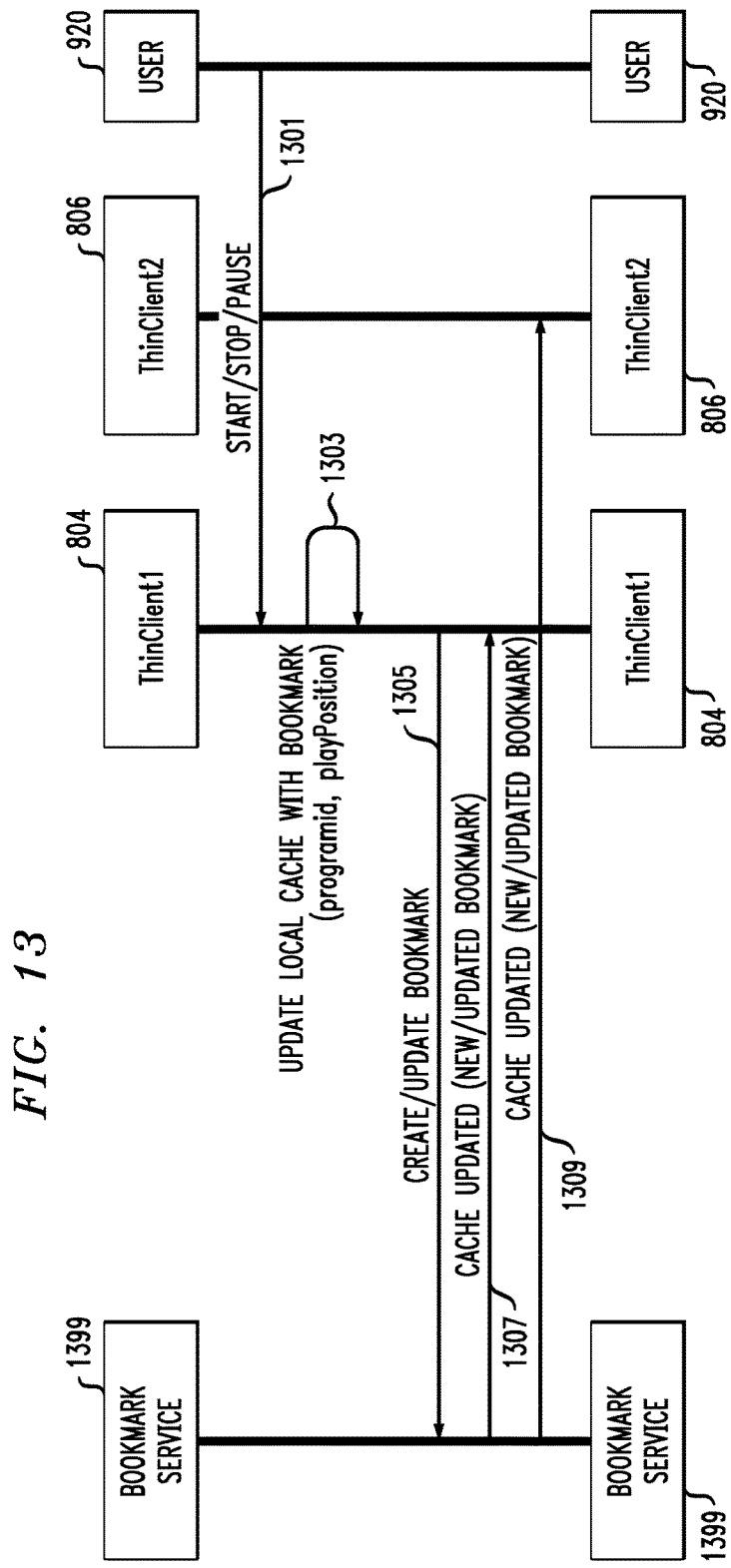
FIG. 13 shows an exemplary bookmark cache sequence diagram, in accordance with an aspect of the invention.

Some embodiments include bookmarks, which allow the user to watch a DVR asset and to bookmark the place in the asset where viewing was paused. Referring to FIG. 13, in one or more embodiments, a separate cloud service 1399 stores these bookmarks. The bookmarks can be synchronized with the thin clients 804, 806 on the STBs 550 as follows. A user 920 initiates a start, stop, or pause action. Note that the ThinClient1 804 that the user made the request on immediately updates its own local cache so that the user sees immediate feedback. In particular, user 920 initiates a start, stop, or pause action 1301 via ThinClient1 804. ThinClient1 804 updates its local cache with the bookmark (program identifier, play position) at 1303. The bookmark is relayed from ThinClient1 804 to the bookmark service 1399 at 1305, causing service 1399 to create a bookmark if none exists or to update any existing pertinent bookmark. The bookmark service 1399 sends a cache update with the bookmark information to ThinClient1 804 at 1307 and to ThinClient2 806 at 1309. Note that, for simplicity, an update can be sent from the bookmark service 1399 to all the ThinClients, including the ThinClient 804 that initiated the action at 1301. However, since the ThinClient 804 that initiated the action at 1301 already knows that it initiated the action, in an alternative approach, updates can be sent from the bookmark service 1399 to all the ThinClients, except the ThinClient that initiated the action.

In some embodiments, a list of episodes for a TV series includes indications as to whether they have been watched, recorded, etc. One or more embodiments also maintain a local cache of the bookmarks in memory 645. Each bookmark has only a relatively small amount of data. Again, similar information regarding bookmarks is maintained on a server implementing the bookmark service 1399 and in local cache. However, the cached bookmark information is faster to access. This cached bookmark information informs the local STB 550 where to resume looking at an asset on DVR 802. Every time the box 550 brings up a UI component, it does not need to go out to cloud service 950 to obtain the bookmark.

Figure 14:
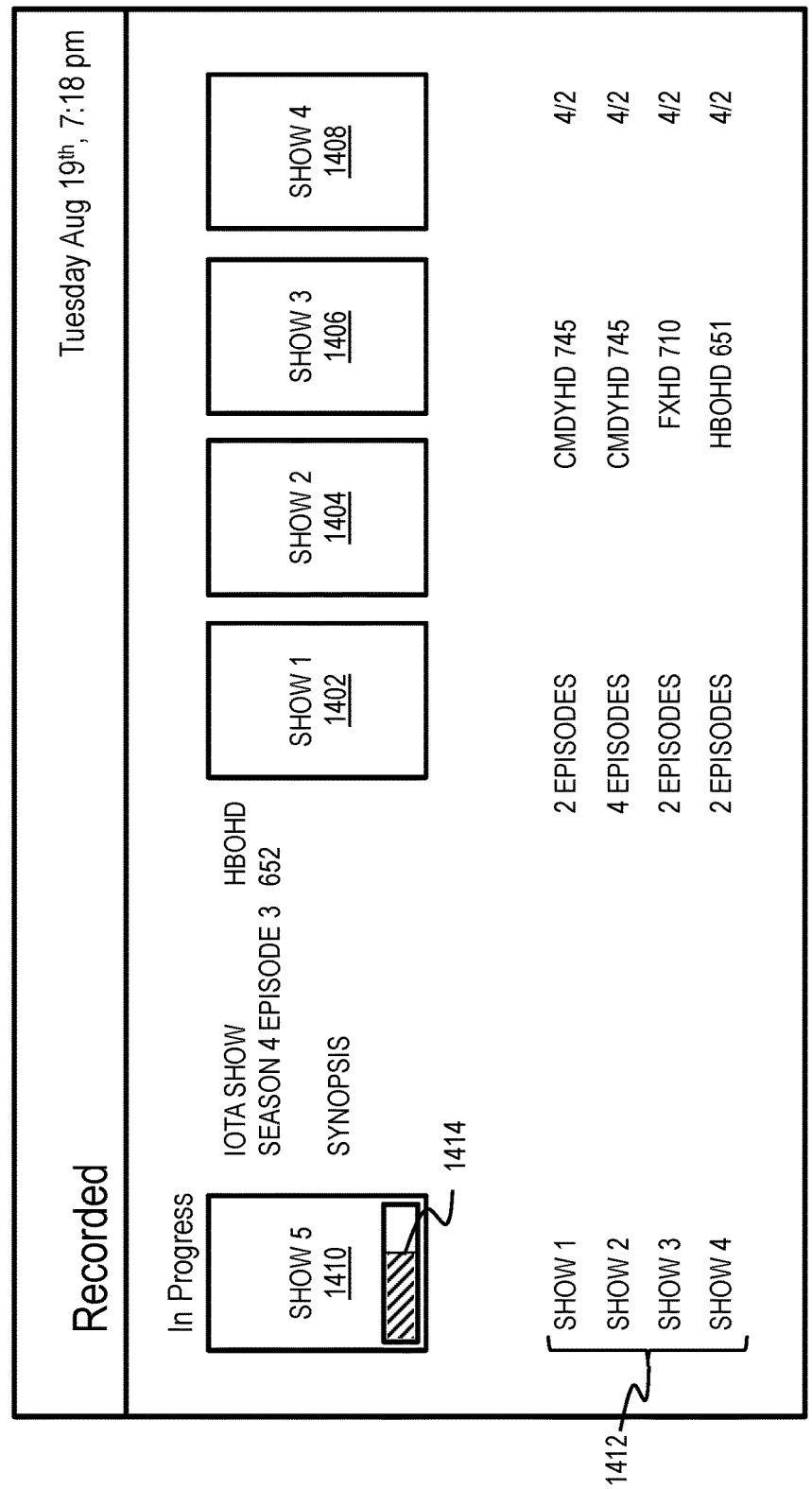
FIG. 14 shows an exemplary screen wherein bookmark information is used to augment information in a recent activity list, in accordance with an aspect of the invention.

FIG. 14 shows an example of cached bookmark information being used to augment information in a recent recording activity list. Recently recorded programs are represented as box art; note box art 1402, 1404, 1406, 1408 for, respectively SHOW 1, SHOW 2, SHOW 3, and SHOW 4. Box art 1410 for SHOW 5 is shown at the upper left to indicate that it is currently in progress. The location of a bookmark for SHOW 5 is shown as progress bar 1414. A list 1412 of recorded programs is shown at the bottom of the screen, with the number of episodes recorded, channel name abbreviation (call letters), channel number, and date (here April 2) of last recording. Optionally, the library can be displayed by date (shown) or title.

For the avoidance of doubt, FIGS. 12 and 14 present show names such as ALPHA SHOW, BETA SHOW, SHOW 1, SHOW 2, etc.; actual implementations would include names of actual programs available to be watched.

In addition to receiving video assets, the premises may also exchange Internet traffic (e.g., TCP/IP and other packets) with the head end 150 and/or other remote locations. Received digital programming is obtained by the DVR 802 and/or boxes 550. Programming requests and other control information may be forwarded up to the head end for appropriate handling.

With continued reference to FIG. 6, the same is a block diagram of one exemplary embodiment of the DVR 802 and STB 550 of FIG. 5. The exemplary DVR 802 includes a bus 612 coupling a microprocessor 606, memory unit 610, mass storage unit 556-L, a suitable MoCA interface 691 (or other suitable network interface to the STBs 550), cable modem 693, and the tuners 695. The memory unit 610 typically comprises a random access memory (RAM) and mass storage unit 556-L typically comprises a hard disk drive, an optical drive (e.g., CD-ROM or DVD), NAND flash memory, RAID (redundant array of inexpensive disks) configuration, or some combination thereof.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

During operation of the DVR 802, software located in the storage unit 556-L is run on the microprocessor 606 using the memory unit 610 (e.g., a program memory within or external to the microprocessor). The software controls the operation of the other components of the system, and provides various other functions within the DVR 802. Other system software/firmware may also be externally reprogrammed, such as using a download and reprogramming of the contents of the flash memory, replacement of files on the storage device or within other non-volatile storage, etc. This allows for remote reprogramming or reconfiguration of the DVR 802 by the MSO or other network agent.

It should be noted that some embodiments provide a cloud-based user interface, wherein the DVR 802 and/or STBs 550 access a user interface on a server in the cloud, such as in NDC 1098. See discussion of FIG. 11.

Exemplary lightweight STB 550 includes a bus 641 coupling a microprocessor 643, memory unit 645, a suitable MoCA interface 647 (or other suitable network interface to the DVR 802), and an interface 649 (e.g., connection for a cable) to a TV. The memory unit 645 typically comprises a random access memory (RAM) and a small amount of non-volatile memory. Again, an alternative bus architecture could be employed in the STB 550.

In some instances, cable modem 693 is a DOCSIS cable modem for delivery of traditional broadband Internet services. This connection can be shared by all Internet devices in the premises 801.

A software management package (application) is also provided on DVR 802 in some embodiments to control, configure, monitor and provision the DVR 802 from the cable head-end 150 or other remote network node via the cable modem (DOCSIS) interface. This control allows a remote user to configure and monitor the DVR 802 and home network.

The MoCA interfaces 647, 691 can be configured, for example, in accordance with the MoCA 1.0, 1.1, or 2.0 specifications.

Figure 8:
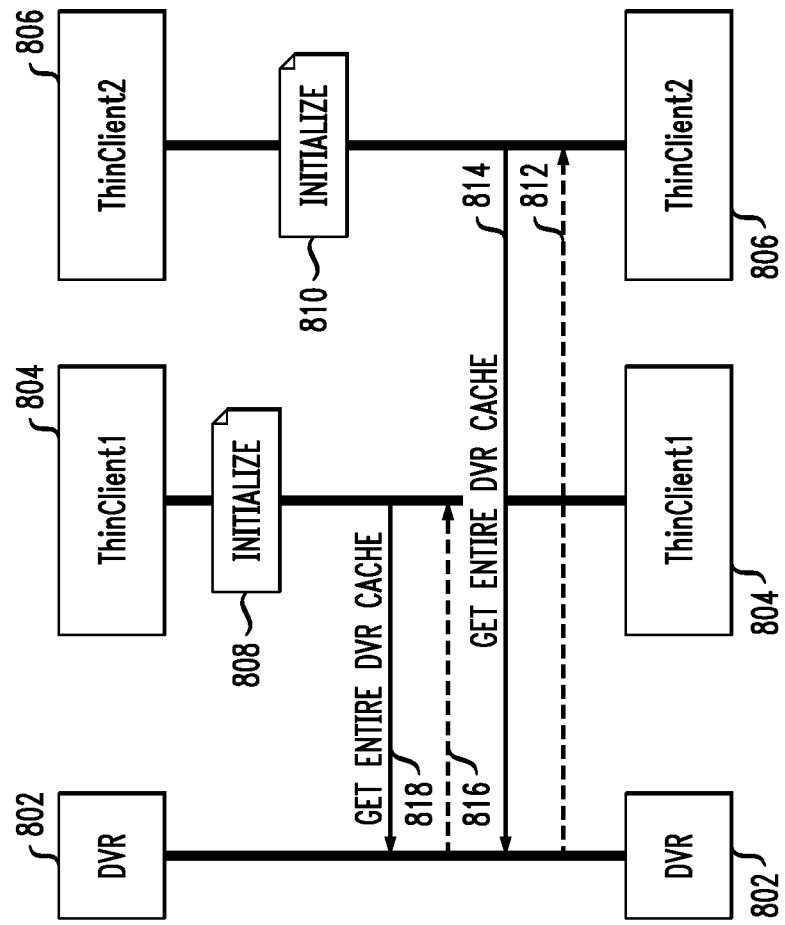
FIG. 8 is a message sequence chart showing initialization, in accordance with an aspect of the invention.

FIG. 8 shows an exemplary initialization process. High-capacity in-premises DVR 802 (hereinafter simply "DVR 802") interacts with any number of thin clients (here, ThinClient1 804 and ThinClient2 806). Each of the thin clients undergoes an initialization process 808, 810. Each of the thin clients obtains all the information in the DVR cache from DVR 802 as seen at 814, 812 for ThinClient2 806 and 818, 816 for ThinClient1 804. The "thin" clients include software programs residing on the "thin" or "lightweight" STBs 550.

Figure 9:
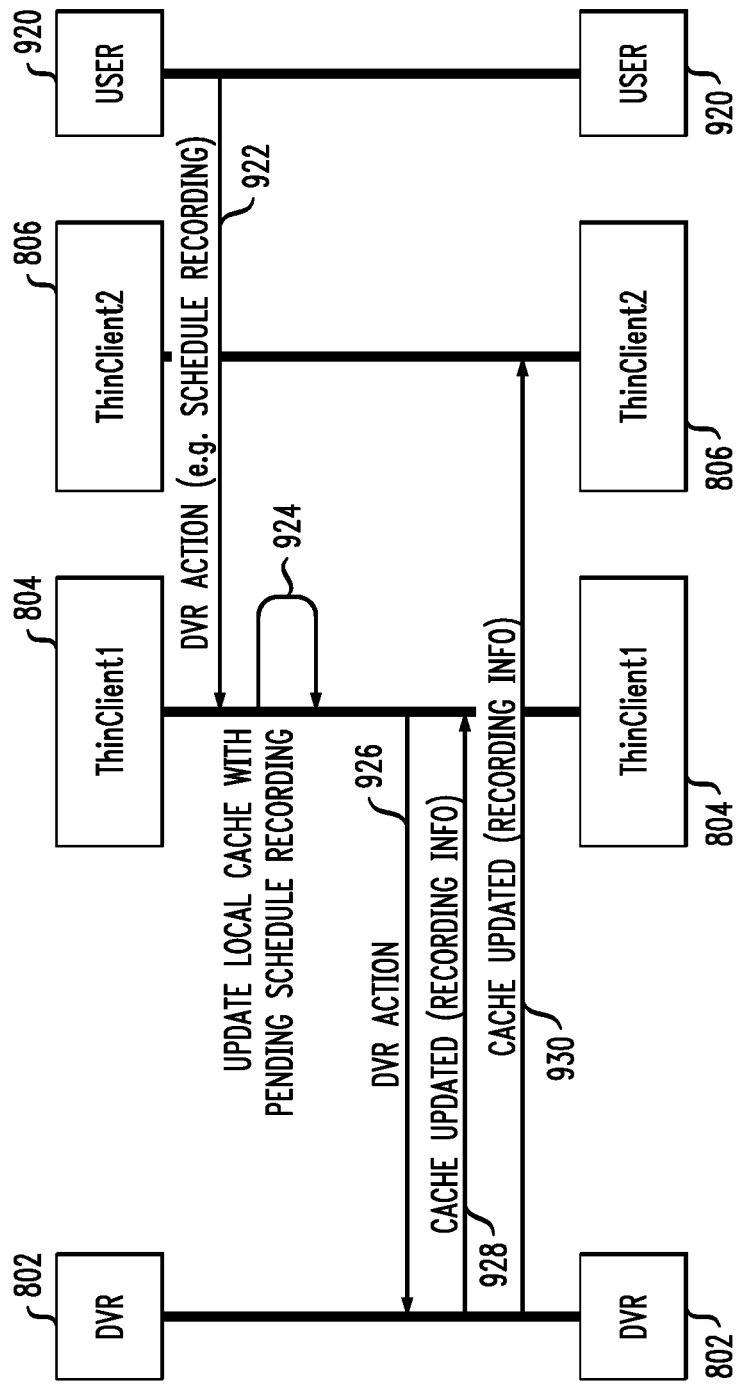
FIG. 9 is a message sequence chart showing user scheduling of a recording, in accordance with an aspect of the invention.

FIG. 9 shows an instance where a user 920 schedules a recording. This is a case where the cache updates only one record. Note that the ThinClient1 804 that the user made the request on immediately updates its own local cache so that the user sees immediate feedback. In particular, user 920 takes a DVR action 922 (scheduling a recording) via ThinClient1 804. ThinClient1 804 updates its local cache with the pending scheduled recording at 924. The required DVR action is relayed from ThinClient1 804 to the DVR 802 at 926. The DVR 802 sends a cache update with the recording information to ThinClient1 804 at 928 and to ThinClient2 806 at 930. Note that, for simplicity, an update can be sent from the DVR to all the ThinClients, including the ThinClient that initiated the recording request. However, since the ThinClient that initiated the recording request already knows that it initiated the recording request, in an alternative approach, updates can be sent from the DVR to all the ThinClients, except the ThinClient that initiated the recording request.

Figure 10:
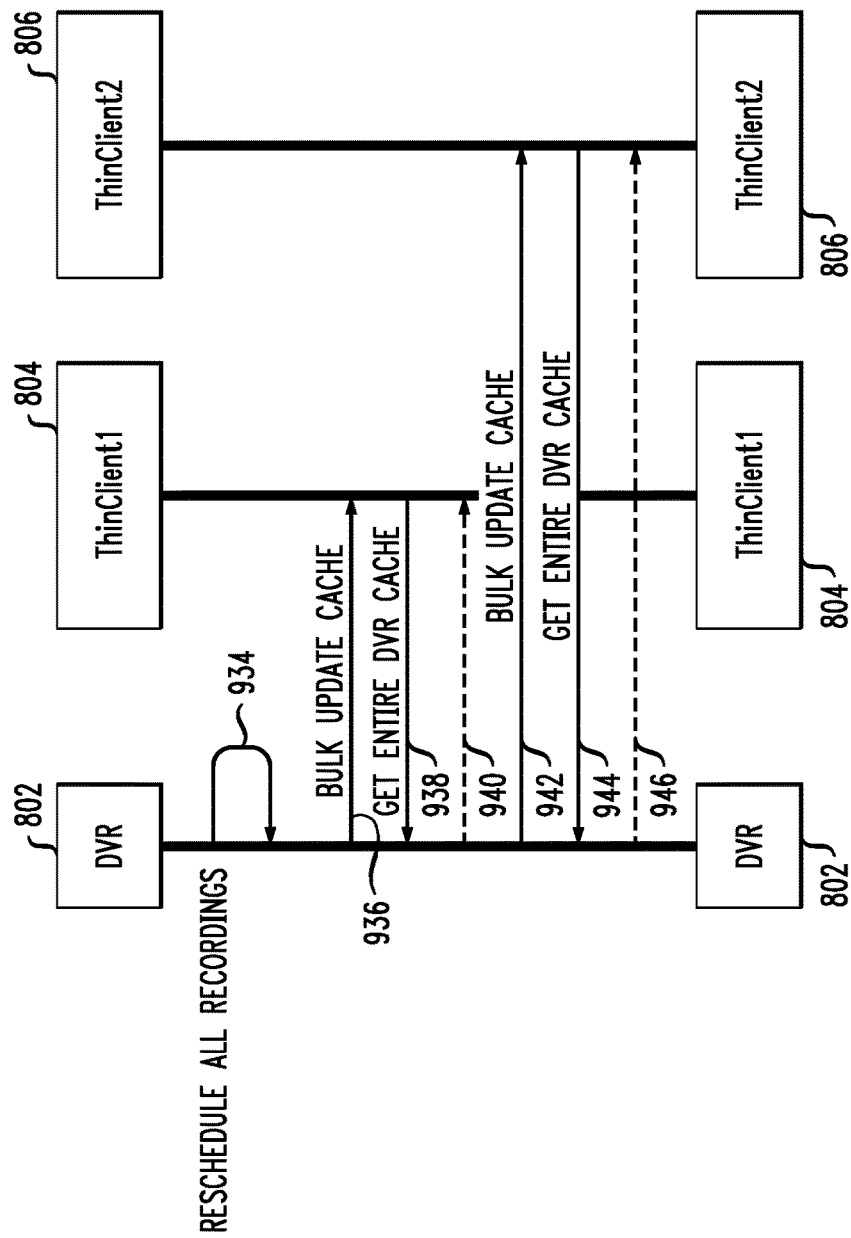
FIG. 10 is a message sequence chart showing re-scheduling of all recordings and re-synchronization of an entire cache, in accordance with an aspect of the invention.

In FIG. 10, some event causes the DVR 802 to reschedule all recordings as seen at 934; for example, new program guide schedules are published. In this case, the clients 804, 806 resynchronize the entire cache. In particular, DVR 802 advises ThinClient1 804 and ThinClient2 806 respectively of the bulk cache update at 936, 942. At 938, 944, ThinClient1 804 and ThinClient2 806 send commands to DVR 802 to obtain the entire DVR cache. At 940, 946, DVR 802 responds to ThinClient1 804 and ThinClient2 806, respectively, with the complete cache update.

Figure 11:
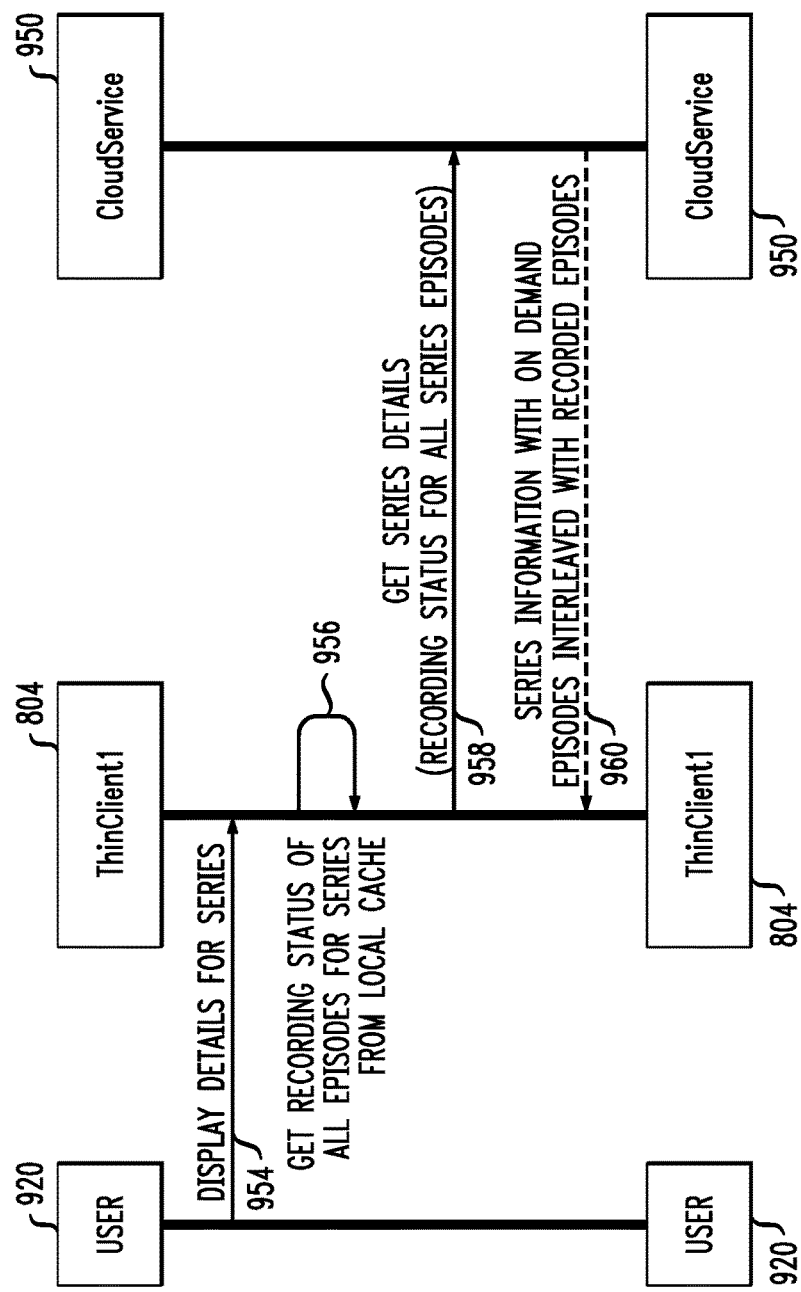
FIG. 11 is a message sequence chart showing a user request for a details page for a television series, in accordance with an aspect of the invention.

In FIG. 11, the user 920, interacting with ThinClient1 804, requests the details page for a certain television series, as seen at 954. As seen at 956, ThinClient1 804 obtains the recording status for all episodes of the series from its local cache. It then sends a request to cloud service 950, as shown at 958, to obtain the details for the series (i.e., recording status for all series episodes). Cloud service 950 providing the details combines information about what episodes the user has recorded with other episodes that are available on demand, and responds at 960.

Given the discussion thus far, it will be appreciated that, in general terms, an exemplary method (see FIGS. 8-10, for example), according to an aspect of the invention, includes the step of maintaining, for a digital video recorder in communication with a plurality of set-top boxes 550, a digital video recorder control database 556-L and/or 556-C including program content, associated programming metadata, and a recording schedule. The skilled artisan will of course appreciate that a "set-top box" need not literally be placed on top of a television set. A further step includes pushing, from the digital video recorder control database to the plurality of set-top boxes, a subset of the digital video recorder control database for local caching on the plurality of set-top boxes. The subset includes at least a portion of the recording schedule.

It will be appreciated that one or more embodiments maintain and access the digital video recorder control database with software 571 running on DVR 802 and/or software 573 running on cloud server 575, in either case accessing suitable mass storage 556-L and/or 556-C with content, metadata, and schedule data. Furthermore, one or more embodiments make use of a client side UI (e.g., in memory 645) to access controls regardless of where the controls are. The pushing step can be carried out with module 558-L or an analogous cloud-based module 558-C.

In some cases, further steps include obtaining, at a digital video recorder controller associated with the digital video recorder control database (e.g., component 573 associated with 556-C and/or component 571 associated with 556-L), an indication that a given one of the set-top boxes has updated its cache with an action (examples of actions are given below); and updating the digital video recorder control database to reflect the action. In some cases, the pushing is carried out in response to obtaining of the indication and the subset that is pushed includes an update to reflect the action. On the other hand, in some cases, the pushing is carried out on a periodic schedule. Immediate pushing in response to the indication advantageously supports place shifting. For example, suppose a viewer is in his or her family room and decides to record something and then his or her children enter the family room and now want to watch something else so that the viewer decides to go to another room to watch the show he or she started recording. In the immediate pushing option, the STB 550 in the other room already has the information.

Exemplary actions include scheduling an individual recording as well as canceling a recording, scheduling a series, canceling a series, and deleting a recorded program.

In some instances, the maintaining step includes maintaining the digital video recorder control database 556-L on a digital video recorder 802 collocated in a premises 801 with the plurality of set-top boxes 550.

In some instances, the maintaining step includes maintaining the digital video recorder control database 556-C on a digital video recorder (e.g., functionality 573 on server 575) in a network node (e.g., head end or data center) remote from a premises 801 in which the plurality of set-top boxes 550 are located.

In some cases, the maintaining step includes maintaining the digital video recorder control database 556-C in a network node (e.g., head end or data center) remote from a premises 801 in which the plurality of set-top boxes 550 are located, and a digital video recorder 802 controlled based on information in the digital video recorder control database is collocated in the premises with the plurality of set-top boxes.

In some cases, the digital video recorder control database includes information which controls a multi-tuner digital video recorder 802 and the subset of the digital video recorder control database pushed in the pushing step includes instructions regarding which tuner 695 of the multi-tuner digital video recorder to use for a recording.

In another aspect, another exemplary method (see, e.g., FIG. 9 from the perspective of ThinClient1 804) includes the step of maintaining, on a first set-top box (say, 550-1) in communication with a digital video recorder control database 556-L and/or 556-C, which in turn is in communication with a plurality of set-top boxes 550-1 through N including the first set-top box, a cache including a subset of the digital video recorder control database. The digital video recorder control database includes program content, associated programming metadata, and a recording schedule. The cache includes at least a portion of the recording schedule. A further step includes updating the cache on the first set-top box 550-1 to reflect an action. Non-limiting examples of actions include scheduling an individual recording as well as canceling a recording, scheduling a series, canceling a series, and deleting a recorded program.

A still further step includes sending, from the first set-top box 550-1 to the digital video recorder control database 556-L and/or 556-C, an indication of the action. An even further step includes obtaining, at a second set-top box (say, 550-2), a message pushed from the digital video recorder control database at least to all of the plurality of set-top boxes other than the first set-top box (i.e., at least to boxes 550-2 through 550-N, and optionally to box 550-1 as well). The message indicates that the digital video recorder control database has been updated to reflect the action and that caches of at least the plurality of set-top boxes other than the first set-top box should accordingly be updated. For the avoidance of doubt, the second set-top box is one of the plurality of set-top boxes.

By way of clarification, not that, for simplicity, an update can be sent from the digital video recorder control database to all the ThinClients, including the ThinClient that initiated the recording request. However, since the ThinClient that initiated the recording request already knows that it initiated the recording request, in an alternative approach, updates can be sent from the digital video recorder control database to all the ThinClients, except the ThinClient that initiated the recording request.

In some cases, the maintaining step includes maintaining the cache and the first set-top box 550-1 in a premises 801 with the plurality of set-top boxes 550-1 through 550-N and a digital video recorder 802 on which the digital video recorder control database 556-L is maintained.

In some embodiments, the maintaining step includes maintaining the cache and the first set-top box 550-1 in a premises 801 with the plurality of set-top boxes 550-1 through 550-N, collocated with a digital video recorder 802 controlled using information in the digital video recorder control database 556-C. In this aspect, the premises are remote from a network node (e.g., head end or data center) in which the digital video recorder control database 556-C is located.

In some instances, the maintaining step includes maintaining the cache and the first set-top box 550-1 in a premises 801 with the plurality of set-top boxes 550-1 through 550-N. The premises are remote from a network node (e.g., head end or data center) in which the digital video recorder control database 556-C is located on a digital video recorder (e.g., server 575 with functionality 573).

In some cases, referring to FIG. 11, further steps include obtaining, at the first set-top box, a user input such as 954; obtaining, from the cache on the first set-top box, first information pertinent to the user input, such as at 956; and dispatching, from the first set-top box, to a remote cloud-based service 950, a message requesting second information, such as at 958. The message includes the cached first information pertinent to the user input. An even further step, such as at 960, includes obtaining, at the first set-top box, a response to the message from the remote cloud-based service. The response is formulated, at least in part, based on the cached first information pertinent to the user input included in the message. In a non-limiting example, the user input includes a user request for details of a television series, and the cached first information pertinent to the user request includes recording status for episodes of the series.

It will be appreciated that in addition to returning the information, cloud service 950 and/or other logic on the server on which it is implemented may make decisions based on recording state; for example, returning options that the user can take on the program. Examples of such options include if the program is not recorded, an option to record it; if the program is already recorded, an option to change the record option(s), and the like.

Referring to FIG. 13, in still another aspect, an exemplary method includes maintaining a bookmark service database (database of bookmarks accessible by service 1399; e.g., in a memory 730 of a server 700 on which service 1399 is implemented) in communication with a plurality of set-top boxes (e.g., running thin clients 804, 806). The bookmark service database includes a plurality of bookmarks for a plurality of programs. Each of the bookmarks in turn includes a program identifier and a play position. A further step 1307, 1309 includes pushing, from the bookmark service database to the plurality of set-top boxes, at least a portion of the bookmark service database for local caching on the plurality of set-top boxes.

In some cases, further steps include obtaining, at the bookmark service database, an indication that a given one of the set-top boxes has updated its cache with a bookmark action, as at 1305; and updating the bookmark service database to reflect the action. In this aspect, the pushing 1307, 1309 is carried out in response to the obtaining of the indication and the pushed subset includes an update to reflect the action. On the other hand, in other embodiments, the pushing is carried out on a periodic schedule.

Aspects depicted in FIG. 11 are generally applicable regardless of where the DVR is located or where the DVR is controlled from. Furthermore, aspects depicted in FIG. 11 are not DVR-specific, inasmuch as bookmarks can be used for both DVR and on-demand functionality—basically, any time a program is time-shifted. Local caching of bookmarks in the client makes them available instantly so bookmarks can be instantly reflected in the UI without taking time to go out and request the bookmarks from a service. Bookmarks could be used, for example, to contact a cloud service to obtain program information; when displaying a list of programs a user has already watched (say, a feature of showing all the in-progress shows, whether on-demand or DVR—the cached set of bookmarks can be used to generate and/or annotate the list any time a program appeared in the UI). Refer to FIGS. 12 and 14.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
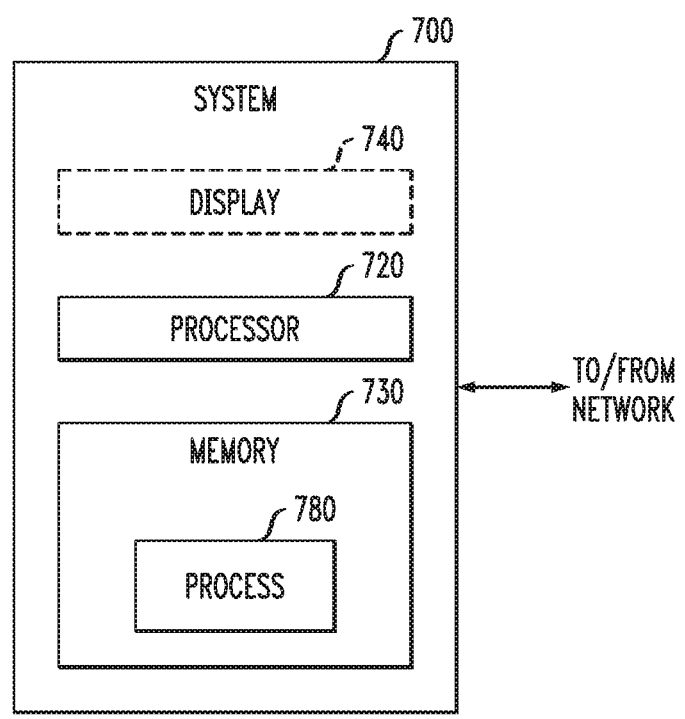
FIG. 7 is a block diagram of a computer system useful in connection with one or more aspects of the invention.

FIG. 7 is a block diagram of a system 700 that can implement, and/or facilitate implementation of, at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700, cloud server 575, system implementing bookmark service 1399 or the like, DVR 802, and/or STB 550), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a DVR, lightweight STB, virtualized or non-virtualized cloud-based hardware server, and the like, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. For example, the modules can include distinct software modules to implement any one, some, or all of the following:

DVR controller-DVR component 571
DVR controller-cloud component 573
server-pushed messaging component 558-L or 558-C
server-side UI 560-L or 560-C
cloud service 950
client-side UI (e.g., in memory 645) and/or other Thin-Client software
bookmark service 1399

Note that DVR controller databases will include mass storage 556-L and/or 556-C accessed by functionality on components 571, 573 or other suitable logic.

The method steps can be carried out using the distinct software modules of the system, as described above, executing on one or more hardware processors 606, 643, 720.

Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium.

Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
maintaining a bookmark service database in communication with a plurality of set-top boxes, said bookmark service database comprising a plurality of bookmarks for a plurality of programs, each of said bookmarks in turn comprising a program identifier and a play position;
obtaining, at said bookmark service database, an indication that a given one of said set-top boxes has updated its cache with a bookmark action;
updating said bookmark service database to reflect said bookmark action; and
pushing, from said bookmark service database to said plurality of set-top boxes other than said given one of said set-top boxes, at least a portion of said bookmark service database for local caching on said plurality of set-top boxes,
wherein said pushing is carried out in response to said obtaining of said indication and wherein said subset includes an update to reflect said bookmark action.

2. The method of claim 1, wherein said pushing is carried out on a periodic schedule.

3. The method of claim 1, further comprising maintaining a digital video recorder control database on a digital video recorder, wherein said digital video recorder is collocated in a premises with said plurality of set-top boxes.

4. The method of claim 3, wherein said digital video recorder control database includes information which controls a multi-tuner digital video recorder, and wherein said portion of said bookmark service database pushed in said pushing step comprises instructions regarding which tuner of said multi-tuner digital video recorder to use for a recording.

5. The method of claim 1, further comprising maintaining a digital video recorder control database on a digital video recorder in a network node remote from a premises in which said plurality of set-top boxes are located.

6. The method of claim 5, wherein said digital video recorder control database includes information which controls a multi-tuner digital video recorder, and wherein said portion of said bookmark service database pushed in said pushing step comprises instructions regarding which tuner of said multi-tuner digital video recorder to use for a recording.

* * * * *